(12) United States Patent
Quanbeck (10) Patent No.: US 8,879,679 B2
(45) Date of Patent: Nov. 4, 2014

(54) FREQUENCY OFFSET COMPENSATION IMPROVEMENT FOR A LONG TERM EVOLUTION (LTE) SEARCHER

(75) Inventor: Chris T. Quanbeck, Libertyville, IL (US)

(73) Assignee: Motorola Mobility LLC, Libertyville, IL (US)

( * ) Notice: Subject to any disclaimer, the term of this patent is extended or adjusted under 35 U.S.C. 154(b) by 166 days.

(21) Appl. No.: 13/594,899

(22) Filed: Aug. 27, 2012

(65) Prior Publication Data

US 2014/0056392 A1 Feb. 27, 2014

(51) Int. Cl.
*H04B 1/10* (2006.01)

(52) U.S. Cl.
USPC ............ 375/350; 375/152; 375/260; 375/344

(58) Field of Classification Search
CPC ............ H04L 27/0014; H04L 25/0206; H04L 25/022; H04L 25/0224; H04L 27/2657
USPC ................. 375/130–153, 259–260, 271–272, 375/278–279, 284, 316–350, 354–377
See application file for complete search history.

(56) References Cited

U.S. PATENT DOCUMENTS

| | | | |
|---|---|---|---|
| 5,999,561 A * | 12/1999 | Naden et al. .................. | 375/142 |
| 6,728,203 B2 | 4/2004 | Wang | |
| 6,760,366 B1 * | 7/2004 | Wheatley et al. ............. | 375/152 |
| 7,130,334 B2 * | 10/2006 | Wheatley et al. ............. | 375/152 |
| 7,689,185 B2 * | 3/2010 | Hur ............................. | 455/161.1 |
| 2004/0146126 A1 * | 7/2004 | Wheatley et al. ............. | 375/343 |
| 2008/0273641 A1 * | 11/2008 | Yang et al. .................... | 375/359 |
| 2009/0232051 A1 * | 9/2009 | Swarts et al. ................. | 370/328 |
| 2011/0026648 A1 * | 2/2011 | Swarts et al. ................. | 375/343 |
| 2011/0047199 A1 * | 2/2011 | Kim et al. ..................... | 708/422 |
| 2011/0103534 A1 | 5/2011 | Axmon et al. | |

* cited by examiner

*Primary Examiner* — Sam K Ahn
*Assistant Examiner* — James M Perez
(74) *Attorney, Agent, or Firm* — Leydig, Voit & Mayer, Ltd.

(57) ABSTRACT

A method and system provide frequency offset compensation in a wireless communication device. A frequency offset compensation module (FOCM) correlates a received reference signal with sub-replica reference sequences to obtain a vector of matched filter output values associated with a time offset identified by a correlation time index value. The FOCM determines a correlation score vector using a combined energy associated with matched filter output values. The FOCM then determines a first phase difference based on matched filter output values corresponding to adjacent sub-replica sequences. The FOCM computes a second phase difference by linearly combining a selected first phase difference and at least one neighbor first phase difference having a second correlation time index value that differs from a first correlation time index value of the selected first phase difference. The FOCM uses the second phase difference to provide compensation for a frequency offset associated with received signals.

20 Claims, 6 Drawing Sheets

FREQUENCY OFFSET COMPENSATION IMPROVEMENT FOR A LONG TERM EVOLUTION (LTE) SEARCHER

BACKGROUND

1. Technical Field

The present disclosure relates in general to wireless communication devices and in particular to frequency offset compensation in wireless communication devices.

2. Description of the Related Art

In the process of cell acquisition for Long Term Evolution (LTE), there is a need to accurately estimate and compensate for the frequency offset (error) between the mobile station local oscillator and the base station local oscillator. Effective compensation requires accurate estimation of the frequency offset, otherwise residual frequency error will cause spectral shift in the compensated signal and cell detection performance will degrade. Furthermore, it is desirable to be able to use a signal which is known a priori to the mobile station (e.g. synchronization signals such as LTE Primary Synchronization Channel (PSCH)) such that the frequency error estimate is available during the initial cell acquisition process. However, synchronization signals are typically transmitted at low power and/or low duty factor, and thus, producing an accurate frequency error estimate can be challenging in the presence of interference from other cells. Furthermore, timing offsets between ideal matched filter sampling offset and an actual sampling offset presents a major challenge to conventional approaches to frequency offset estimation.

BRIEF DESCRIPTION OF THE DRAWINGS

The described embodiments are to be read in conjunction with the accompanying drawings, wherein.

DETAILED DESCRIPTION

The illustrative embodiments provide a method and system for providing frequency offset compensation in a wireless communication device. A frequency offset compensation module (FOCM) correlates a received reference signal with each of a number of sub-replica reference sequences to obtain a vector of matched filter output values associated with a time offset identified by a correlation time index value. The FOCM computes energy of the match filter output values and determines a correlation score vector using a combined energy associated with matched filter output values. The FOCM then determines a first phase difference computed as an average phase difference between matched filter output values for adjacent sub-replica sequences. The FOCM includes a refined phase difference generator that determines a second phase difference computed using a linear combination of a first phase difference associated with a first correlation time index value and at least one neighbor first phase difference. The neighbor first phase differences correspond to correlation time index values that differ from the first correlation time index value by less than a threshold maximum value. The FOCM uses the second phase difference to generate a frequency error estimate in order to compensate for a frequency offset associated with received signals. The various aspects of the method are described below with reference to the figures and in particular with reference to the flow charts of FIGS. 5 and 6.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Figure 1:
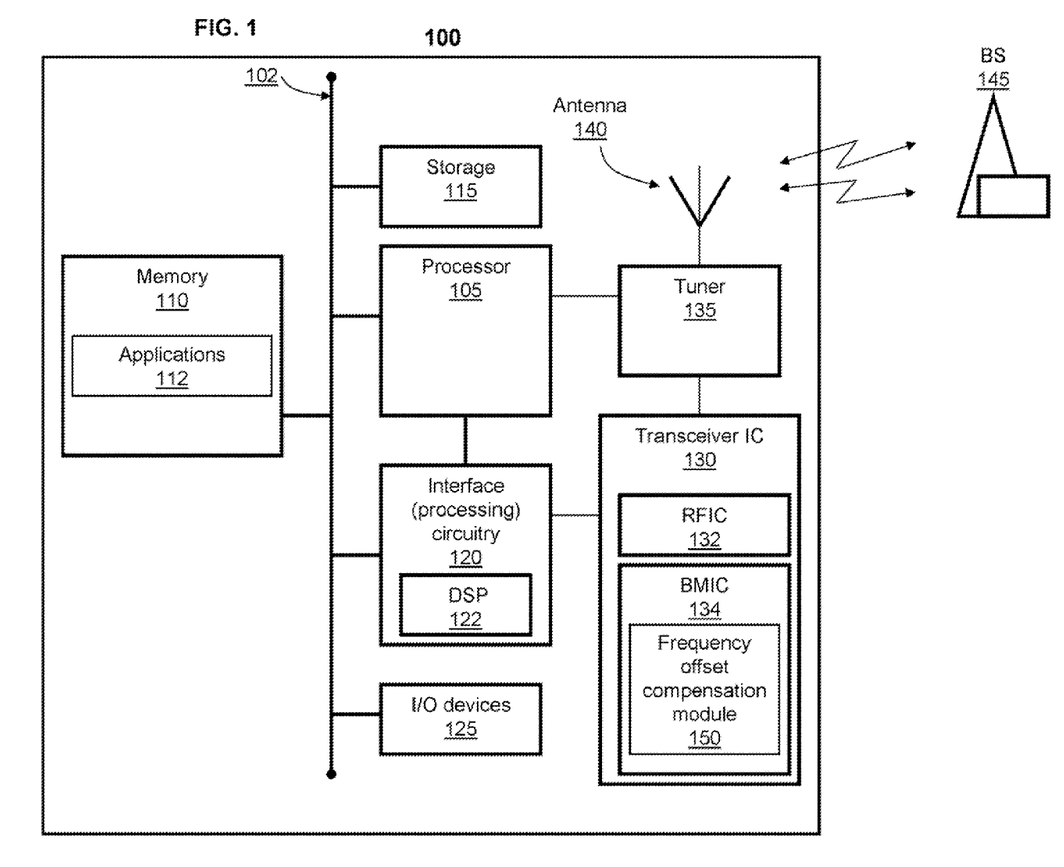
FIG. 1 is a block diagram illustrating an example wireless communication device within which the various features of the described embodiments can be advantageously implemented, according to one embodiment.

With specific reference now to FIG. 1, there is depicted a block diagram of an example wireless communication device 100, within which the functional aspects of the described embodiments may advantageously be implemented. Wireless communication device 100 represents a device that is adapted to transmit and receive electromagnetic signals over an air interface via uplink and/or downlink channels between the wireless communication device 100 and communication network equipment (e.g., base-station 145) utilizing a plurality of different communication standards including Long Term Evolution (LTE). In one or more embodiments, the wireless communication device 100 can be a mobile cellular device/phone or smartphone, or laptop, netbook or tablet computing device, or other types of communications devices. Wireless communication device 100 comprises processor 105 and interface circuitry 120, which includes digital signal processor (DSP) 122. Processor 105 and interface circuitry 120 are connected to memory component 110 via signal bus 102. Wireless communication device 100 includes one or more input/output devices 125 and also includes a transceiver integrated circuit 130 for sending and receiving communication signals. In at least some embodiments, the sending and receiving of communication signals occur wirelessly and are facilitated by one or more antennas 140 coupled to the transceiver IC 130. The number of antennas can vary from device to device, ranging from a single antenna to two or more antennas, and the presentation within wireless communication device 100 of one antenna is merely for illustration. Wireless communication device 100 is able to wirelessly communicate to base-station 145 via antenna 140. Base-station 145 can be any one of a number of different types of network stations and/or antennas associated with the infrastructure of the wireless network, and configured to support uplink and downlink communication via one or more of the wireless communication protocols, as known by those skilled in the art. Transceiver IC 130 comprises baseband modem integrated circuit (BMIC) 134 and radio frequency integrated circuit (RFIC) 132. BMIC 134 comprises frequency offset compensation module (FOCM) 150. In one embodiment, BMIC 134 comprises a local processor, which can be described as a digital signal processor (DSP), and a memory or storage system. According to one aspect of the disclosure, the memory/storage system includes therein firmware which supports the various processing functions of BMIC 134. The structural makeup of FOCM 150 is described in greater detail in FIG. 2.

In addition to the above described hardware components of wireless communication device 100, various features of the invention may be completed/supported via software or firmware code and/or logic stored within memory 110 or other storage 115 or within local storage of BMIC 134 and respectively executed by DSP 122, Processor 105, or a local processor of BMIC 134.

The various components within wireless communication device 100 can be electrically and/or communicatively coupled together as illustrated in FIG. 1. As utilized herein, the term "communicatively coupled" means that information signals are transmissible through various interconnections between the components. The interconnections between the components can be direct interconnections that include conductive transmission media, or may be indirect interconnections that include one or more intermediate electrical components. Although certain direct interconnections are illustrated in FIG. 1, it is to be understood that more, fewer or different interconnections may be present in other embodiments.

Aspects of the disclosure refer to the correlation of sub-replica sequences with received pilot or reference signals. These sub-replica sequences are time offset partitions of a local replica of the known transmitted reference signal. In order to accurately estimate and compensate for the frequency offset (error) between the mobile station local oscillator and the base station local oscillator, a frequency offset compensation module (FOCM) within a wireless communication device estimates frequency error by using a phase differential of "consecutive correlations" between received signal and the sub-replicas of the known transmitted reference signal. These consecutive correlations refer to correlations involving adjacent sub-replicas. By providing effective compensation, the FOCM minimizes and/or eliminates residual frequency error that can cause spectral shift in the compensated signal and degradation of cell detection performance.

Aspects of the disclosure refer to "primary correlation score" and "primary first phase difference" to identify a correlation score and a first phase difference that are under current evaluation and/or represent a current selection. A primary correlation score and a primary phase difference are indexed using a corresponding first correlation time index value. The remaining correlation scores, excluding the primary correlation score, are neighbor correlation scores of the primary correlation score. A neighbor correlation score utilizes a second correlation time index value that is different from the first correlation time index value.

Figure 2:
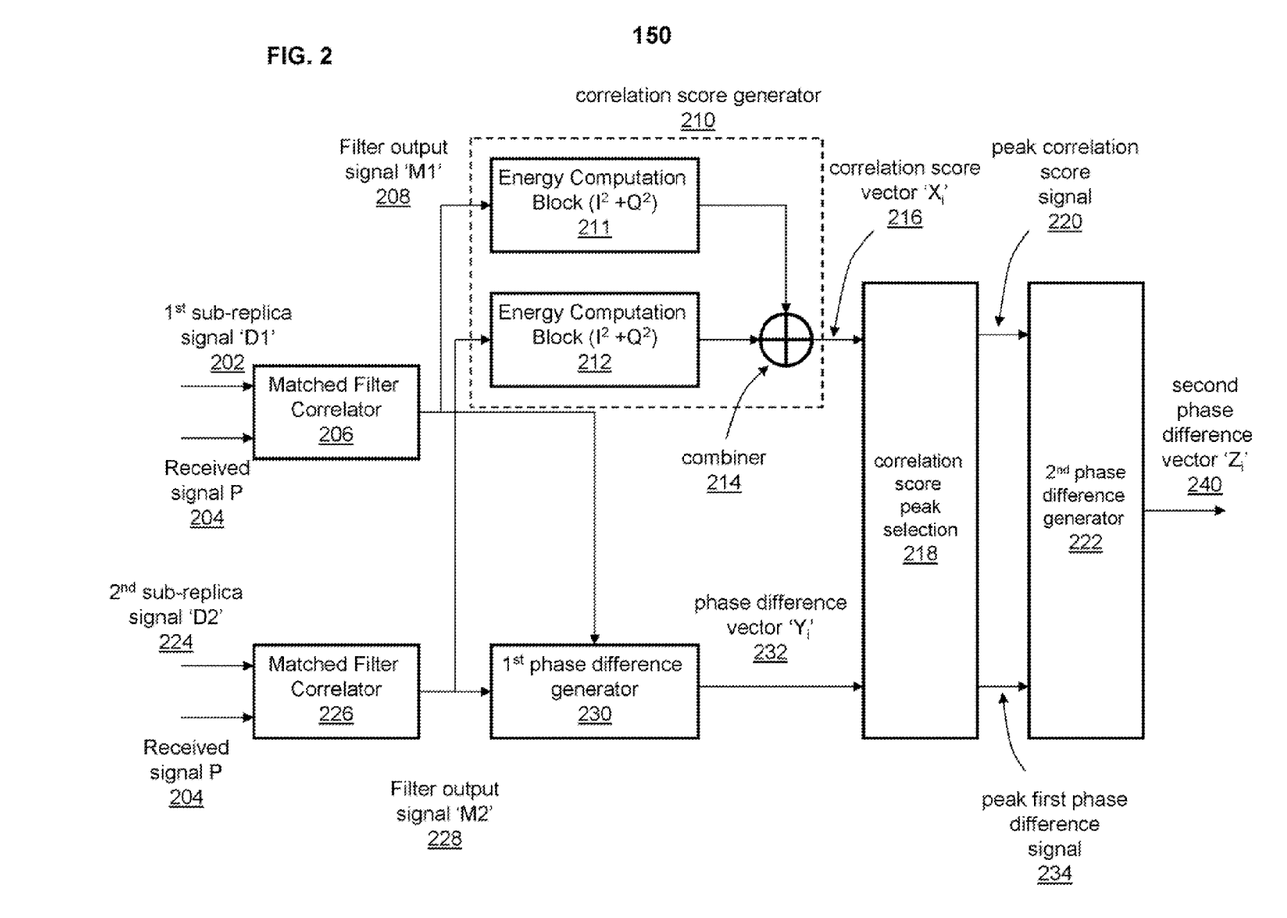
FIG. 2 provides a block diagram representation of a frequency offset compensation module (FOCM), according to one embodiment.

FIG. 2 provides a block diagram representation of frequency offset compensation module (FOCM), according to one embodiment. FOCM 150 comprises first matched filter correlator 206 and second matched filter correlator 226. FOCM 150 also comprises correlation score generator 210 and first phase difference generator 230. The input ports of correlation score generator 210 are respectively coupled to an output port of first matched filter correlator 206 and to an output port of second matched filter correlator 226. In general, the number of matched filter correlators in FOCM 150 is equal to the number, L, of sub-replicas into which the reference signal is partitioned. FIG. 2 shows an exemplary embodiment using L=2 partitions of the reference signal. Correlation score generator 210 comprises first energy computation block 211, second energy computation block 212 and combiner 214. The input ports of first phase difference generator 230 are respectively coupled to an output port of first matched filter correlator 206 and to an output port of second matched filter correlator 226. FOCM 150 also comprises correlation score peak selection module (CSPS) 218 coupled to output ports of correlation score generator 210 and first phase difference generator 230, and second phase difference generator 222 coupled to CSPS 218.

Matched filter correlator 206 respectively receives first sub-replica signal 'D1' 202 and received signal 'P' 204, at a first input port and a second input port of matched filter correlator 206. Matched filter correlator 206 generates filter output signal 'M1' 208, which is passed to inputs of correlation score generator 210 and first phase difference generator 230. Matched filter correlator 226 respectively receives second sub-replica signal 'D2' 224 and received signal 'P' 204, at a first input port and a second input port of matched filter correlator 226. Matched filter correlator 226 generates filter output signal 'M2' 228, which is also passed to inputs of correlation score generator 210 and first phase difference generator 230. First energy computation block 211 located within correlation score generator 210 receives filter output signal 'M1' 208 from matched filter correlator 206, and second energy computation block 212 receives filter output signal 'M2' 228 from matched filter correlator 226. Correlation score generator 210 generates correlation score vector '$X_i$' 216 from the input signals. First phase difference generator 230 generates phase difference vector '$Y_i$' 232 from the input signals.

CSPS 218 receives correlation score vector '$X_i$' 216 at a first input port and phase difference vector '$Y_i$' 232 at a second input port of CSPS 218. CSPS 218 generates a peak or highest correlation score vector and a corresponding peak phase difference vector, which second phase difference generator 222 receives as peak correlation score signal 220 and peak first phase difference signal 234, respectively at first and second input ports of second phase difference generator 222. Second phase difference generator 222 generates a second phase difference illustrated as refined phase difference vector '$Z_i$' 240.

In FOCM 150, first matched filter correlator 206 correlates received signal 'P' 204 with first sub-replica signal 'D1' 202 and generates at least one vector of matched filter output values each illustrated as filter output signal 'M1' 208. Similarly, second matched filter correlator 226 correlates received signal 'P' 204 with second sub-replica signal 'D2' 224 and generates at least one vector of matched filter output values each illustrated as filter output signal 'M2' 228. Each value within a vector of matched filter output values is associated with a respective time offset identified by a correlation time index value 'i'. In general, L matched filter output vectors corresponding to L time-offset partitions of the reference signal can be generated for correlations performed using a sub-replica signal and a received signal. Received signal 'P' 204 corresponds to a reference signal transmitted by base-station 145 (FIG. 1). The sub-replica sequences are obtained by partitioning a replica of the reference signal. An energy computation component constituting first energy computation block 211 and second energy computation block 212 computes energy associated with the match filter output values. Correlation score generator 210 computes a combined energy value associated with the match filter output values. Correlation score generator 210 determines, for each correlation time index value, a primary correlation score by using the combined energy value associated with the corresponding matched filter output values. Correlation score generator 210 performs computation of the combined energy value over matched filter output values for all sub-replicas. First phase difference generator 230 determines, for each correlation time index value, a first phase difference computed as an average phase difference between matched filter output values for adjacent sub-replica sequences.

CSPS 218 receives correlation score vector '$X_i$' 216 at a first input port and phase difference vector '$Y_i$' 232 at a second input port of CSPS 218. Based on a control signal (e.g., control signal 306 illustrated in FIG. 3) from second phase difference generator 222, CSPS 218: sorts a vector of correlation scores corresponding to multiple correlation time index values; determines a peak vector size limit that is used to limit the number of elements in peak correlation score signal 220 and peak first phase difference signal 234 passed to second phase difference generator 222; and selects a collection of highest or peak correlation scores from among the plurality of correlation scores within the sorted vector, based on the peak vector size limit. The correlation scores are sorted based on the peak/highest correlation scores and the sorted vector of peak correlation scores provides a re-ordered list of correlation time index values. Using the re-ordered list of correlation time index values obtained from sorting the correlation score vector, phase difference vector 232 is sorted to produce corresponding peak first phase difference signal 234. FOCM 150 reduces computational complexity by utilizing a relatively small time offset limit to determine a second phase difference vector. As described in FIG. 3 and further illustrations, second phase difference generator 222 generates a second phase difference vector and FOCM 150 uses the second phase difference vector to estimate a frequency offset error in order to determine and/or provide an appropriate frequency offset error compensation.

Figure 3:
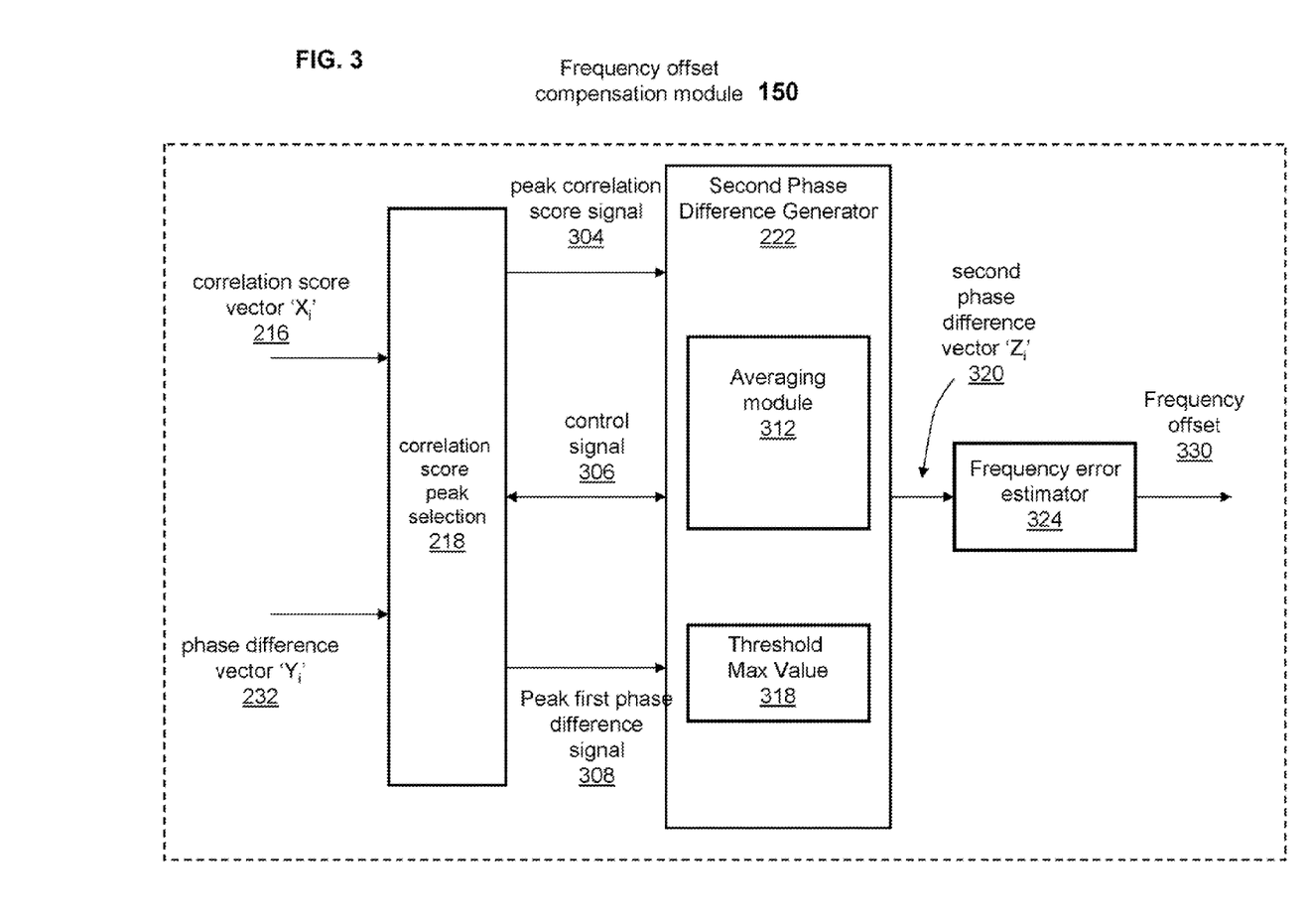
FIG. 3 is an example block diagram illustrating phase difference generating components of a frequency offset compensation module, according to one embodiment.

FIG. 3 is a block diagram illustrating a detailed view of phase difference generating components of a frequency offset compensation module, according to one embodiment. Frequency offset compensation module (FOCM) 150 comprises correlation score peak selection block (CSPS) 218, second phase difference generator 222 and frequency error estimator 324. CSPS 218 receives correlation score vector '$X_i$' 216 at a first input port and phase difference vector '$Y_i$' 232 at a second input port. CSPS 218 generates a peak or highest correlation score vector and a corresponding peak first phase difference vector and forwards to second phase difference generator 222 as peak correlation score signal 304 and peak first phase difference signal 308. Second phase difference generator 222 comprises an averaging module 312 and a stored time offset window size illustrated as threshold maximum value 318. In addition, CSPS 218 and second phase difference generator 222 include corresponding control signal ports to communicate control information such as control signal(s) 306 between CSPS 218 and second phase difference generator 222. Second phase difference generator 222 generates a second phase difference and forwards the second phase difference, illustrated as second phase difference vector '$Z_i$' 320, to an input port of frequency error estimator 324. Frequency error estimator 324 generates frequency offset 330.

Second phase difference generator 222 linearly combines at least one neighbor first phase difference with a peak primary first phase difference to determine the second phase difference vector. In particular, second, refined phase difference generator 222 determines, for a selected number of correlation time index values, a second phase difference vector computed using a linear combination of (a) a peak primary first phase difference and (b) neighbor first phase differences. A primary correlation time index value represents a correlation time index value of a primary first phase difference. The neighbor first phase differences correspond to secondary correlation time index values that differ from the primary correlation time index value by less than threshold maximum value 318. Second phase difference generator 222 triggers frequency error estimator 324 to compute, for the selected correlation index values, an estimate of frequency error using the second phase difference vector. The frequency error is associated with oscillator components within at least one of wireless communication device 100 and base-station 145. The frequency error estimate (i.e., frequency offset 330) is utilized by wireless communication device 100 to compensate for the frequency offset associated with received signals.

Figure 4:
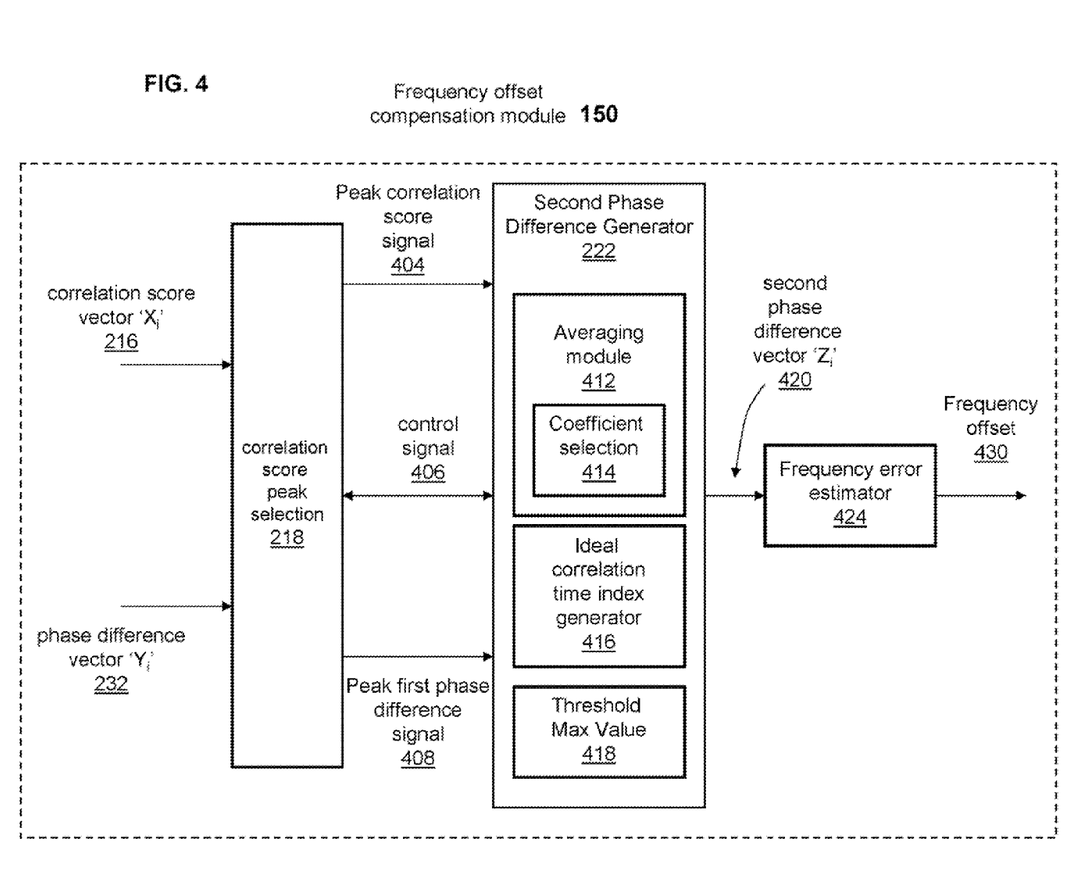
FIG. 4 is another block diagram illustrating a second embodiment of the phase difference generating components a second frequency offset compensation module, according to another embodiment.

FIG. 4 is another block diagram illustrating a second embodiment of phase difference generating components of another frequency offset compensation module, according to one embodiment. Frequency offset compensation module (FOCM) 150 comprises correlation score peak selection block (CSPS) 218, second phase difference generator 222 and frequency error estimator 424. CSPS 218 receives correlation score vector '$X_i$' 216 at a first input port and phase difference vector '$Y_i$' 232 at a second input port. CSPS 218 generates a peak or highest correlation score vector and a corresponding peak first phase difference vector and forwards to second phase difference generator 222 as peak correlation score signal 404 and peak first phase difference signal 408. Second phase difference generator 222 comprises a weighted averaging module 412, which comprises coefficient selection module 414. Second phase difference generator 222 also comprises a stored time offset window size illustrated as threshold maximum value 418. In addition, second phase difference generator 222 comprises ideal correlation time index generator 416. In addition, CSPS 218 and second phase difference generator 222 include corresponding control signal ports to communicate control information such as control signal(s) 406 between CSPS 218 and second phase difference generator 222. Second phase difference generator 222 generates a second phase difference and forwards the second phase difference, illustrated as second phase difference vector 'Z$_i$' 420, to an input port of frequency error estimator 424. Frequency error estimator 424 generates frequency offset 430.

Second, refined phase difference generator 222 determines, for each of a selected number of correlation time index values, a second phase difference computed using a weighted average of a peak primary first phase difference and neighbor first phase differences. The neighbor first phase differences correspond to secondary correlation time index values that differ from a primary correlation time index value of a peak primary first phase difference by less than threshold maximum value 418. Second phase difference generator 222 triggers a frequency error estimator 424 to compute, for the selected correlation index values, an estimate of frequency error using the second phase difference. The frequency error is associated with oscillator components within at least one of wireless communication device 100 and base-station 145. The estimate (i.e., frequency offset 430) is utilized by wireless communication device 100 to compensate for a frequency offset associated with received signals.

Second phase difference generator 222 determines coefficient values for linearly weighting the at least one neighbor first phase difference by using a ratio of the peak primary correlation score and a neighbor correlation score corresponding to each one of the at least one neighbor first phase difference. As a result, second phase difference generator 222 provides a substantially equal weighting for a neighbor first phase difference relative to a weighting of a peak primary first phase difference corresponding to the peak primary correlation score, in response to determining that the ratio of the peak primary and neighbor correlation scores are substantially equal to one. In response to determining that the ratio of the neighbor and peak primary correlation scores are within a first pre-determined range, where the peak primary correlation score is substantially greater than the neighbor correlation score, second phase difference generator 222 assigns a substantially zero weighting to a corresponding neighbor phase difference. Second phase difference generator 222 provides a linearly determined weighting for a neighbor first phase difference in response to determining that the ratio of the peak primary and neighbor correlation scores are within a second predetermined range that is greater than the first pre-determined range.

In one embodiment, second phase difference generator 222 determines an ideal correlation time index as a fractional time index between the primary correlation time index and the secondary correlation time index. Second phase difference generator 222 computes the ideal time index using the peak primary and neighbor correlation scores. Furthermore, second phase difference generator 222 uses the ideal correlation time index to determine weighting coefficients for combining at least one neighbor first phase difference with a peak primary first phase difference to determine the second phase difference.

According to one embodiment, for the case of de-composition of the replica signal into two sub-replica signals, the matched filter correlation between the received signal and the replica signal is used to produce a correlation score as follows:

$$X_i = \left| \sum_{j=0}^{M-1} D_{i+2j} P_{k,j} * \right|^2 + \left| \sum_{j=M}^{2M-1} D_{i+2j} P_{k,j} * \right|^2$$

where:
$X_i$ is the correlation score (real-valued)
i is the time index for correlation score
D is the replica signal
j is the correlation offset time index
P is the received signal
M is the length of a sub-replica Frequency offset estimation is obtained as a by-product of the matched filter correlation. The rotation of the complex correlation between each adjacent sub-replica is evaluated by multiplying the conjugate of the $1^{st}$ sub-replica correlation with the $2^{nd}$ sub-replica correlation, as follows, to produce first phase difference vector $Y_i$:

$$Y_i = \left( \sum_{j=0}^{M-1} D_{i+2j} P_j^* \right)^* \sum_{j=M}^{2M-1} D_{i+2j} P_j^*$$

Enhanced frequency estimate $Z_i$ is produced as a linear combination of $Y_i$ (FIG. 3):

$$Z_i = \sum_{j=-W}^{W} a_j Y_{i+j}$$

where:
W is the time offset window size (e.g., threshold maximum value 318)
$a_j$ are coefficients used to weight peak primary and neighbor first phase differences.

The frequency offset estimate can then be directly derived from the angle of $Z_i$:

$$\hat{f}_{offset} = \frac{\angle Z_i}{2\pi \cdot \Delta N} \cdot f_s$$

where:
$f_s$ is the sampling frequency
$\Delta N$ is the sample lag between adjacent sub-replicas.

Those of ordinary skill in the art will appreciate that the hardware components and basic configurations depicted in FIGS. 1, 2, 3, and 4 may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

Figure 5:
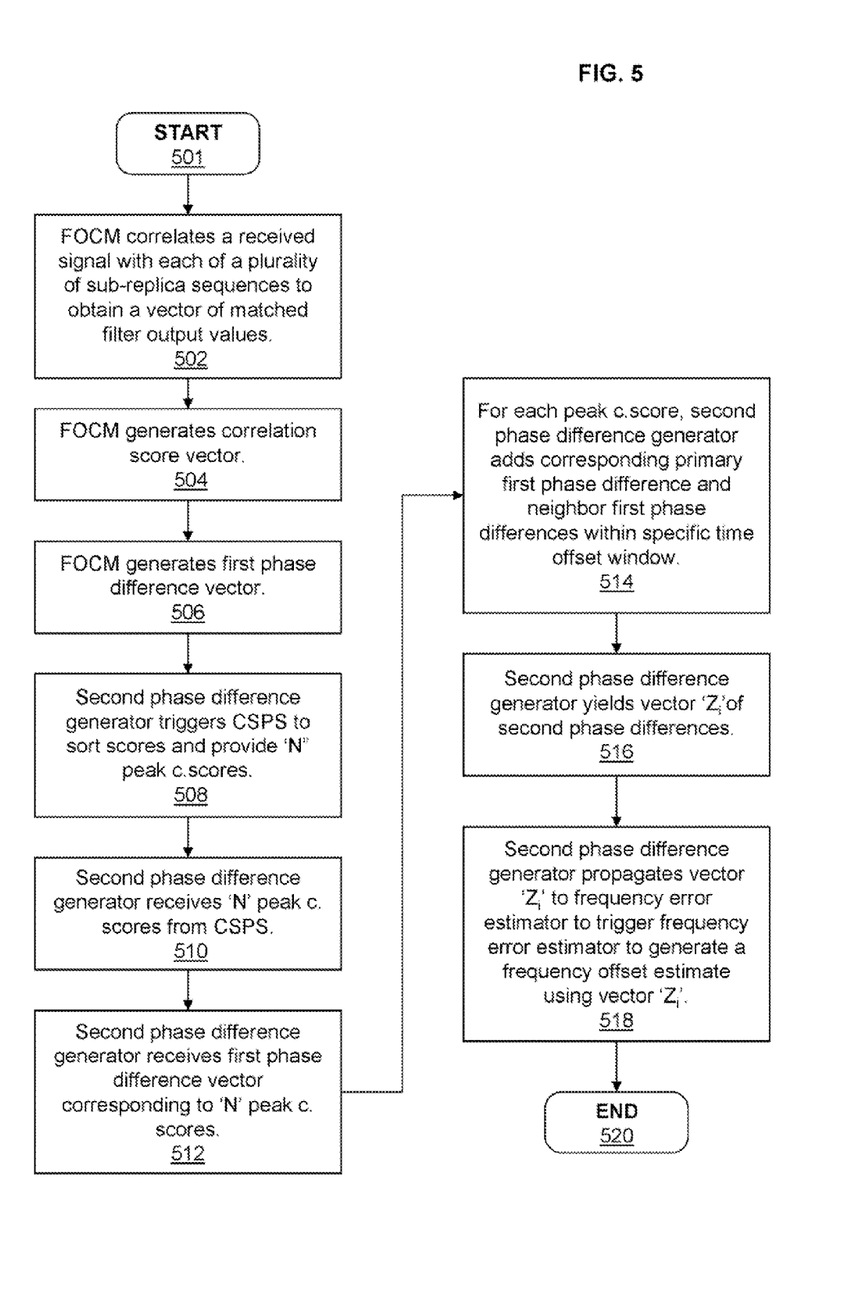
FIG. 5 is a flow chart illustrating a method for generating a second phase difference that is used to estimate a frequency offset error associated with received communication signals, according to one embodiment.
Figure 6:
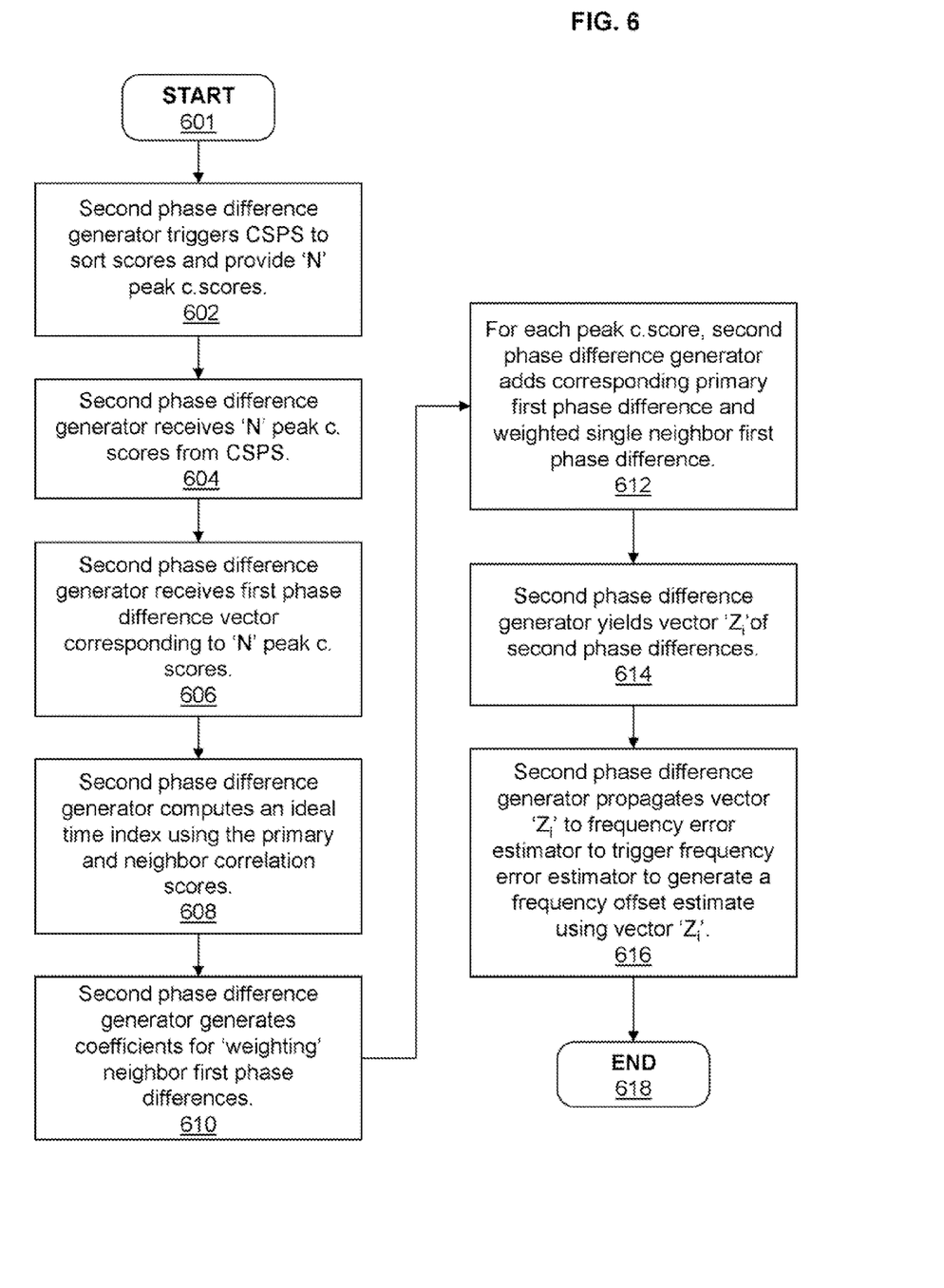
FIG. 6 is a flow chart illustrating another method for generating a second phase difference that is used to estimate a frequency offset error associated with received communication signals, according to one embodiment.

FIGS. 5 and 6 are flow charts illustrating different embodiments of the methods by which the above processes of the illustrative embodiments can be implemented. Specifically, FIG. 5 illustrates a method for generating a second phase difference that is used to estimate a frequency offset error associated with received communication signals, according to one embodiment. FIG. 6 illustrates another method for generating a second phase difference that is used to estimate a frequency offset error associated with received communication signals, according to another embodiment. Although the method illustrated by FIGS. 5 and 6 may be described with reference to components and functionality illustrated by and described in reference to FIGS. 1-4, it should be understood that this is merely for convenience and alternative components and/or configurations thereof can be employed when implementing each method. Certain portions of the methods may be completed by Second Phase Difference Generator 222 of FOCM 150 located within wireless communication device 100 (FIG. 1). For simplicity in describing the methods, all method processes are described from the perspective of FOCM 150 and specifically Second Phase Difference Generator 222 of FOCM 150.

The method of FIG. 5 begins at initiator block 501 and proceeds to block 502 at which FOCM 150, using at least one matched filter correlator, correlates a received signal with each of a plurality of sub-replica sequences to obtain matched filter output values associated with a particular time offset identified by a correlation time index value. At block 504, FOCM 150, using a correlation score generator, generates a vector of correlation scores (e.g., correlation score vector '$X_i$' 216) using a combined energy associated with the matched filter output values corresponding to all sub-replica sequences. At block 506, FOCM 150, using a first phase difference generator, generates a first phase difference vector computed as an average phase difference between matched filter output values for adjacent sub-replica sequences. At block 508, second phase difference generator 222 triggers CSPS 218 to sort correlation score vector '$X_i$' 216 and provide 'N' peak correlation scores. At block 510, second phase difference generator 222 receives N peak correlation scores from CSPS 218. At block 512, second phase difference generator 222, receives peak first phase difference vector corresponding to N peak correlation scores. At block 514, for each peak primary correlation score, second phase difference generator 222 adds corresponding primary first phase difference and neighbor first phase differences within a specific time offset window (e.g., threshold maximum value 318). Second phase difference generator 222 yields vector '$Z_i$' of refined or second phase differences, as shown at block 516. At block 518, second phase difference generator 222 propagates vector $Z_i$ to frequency error estimator 324 to trigger frequency error estimator to generate a frequency offset estimate using vector $Z_i$. The process ends at block 520.

The method of FIG. 6 begins at initiator block 601 and proceeds to block 602 at which second phase difference generator 222 triggers CSPS 218 to sort correlation score vector '$X_i$' 216 and provide N peak primary correlation scores. In one embodiment, block 602 follows block 506 of FIG. 5. At block 604, second phase difference generator 222 receives N peak correlation scores from CSPS 218. At block 606, second phase difference generator 222, receives peak primary phase difference vector corresponding to N peak correlation scores. At block 608, in one embodiment, second phase difference generator 222 computes an ideal time index using the peak primary correlation score and at least one neighbor correlation score. Second phase difference generator generates coefficients for weighting neighbor first phase differences, as shown at block 610. In one embodiment, second phase difference generator 222 utilizes the computed ideal time index to generate weighting coefficients.

At block 612, for each peak primary correlation score, second phase difference generator 222 adds a corresponding peak primary first phase difference and a weighted single neighbor first phase difference. Second phase difference generator 222 yields vector $Z_i$ of second phase differences, as shown at block 614. At block 616, second phase difference generator 222 propagates vector $Z_i$ to frequency error estimator 424 to trigger frequency error estimator to generate a frequency offset estimate using vector $Z_i$. The process ends at block 618.

The flowcharts and block diagrams in the various figures presented and described herein illustrate the architecture, functionality, and operation of possible implementations of systems, methods and computer program products according to various embodiments of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Thus, while the method processes are described and illustrated in a particular sequence, use of a specific sequence of processes is not meant to imply any limitations on the disclosure. Changes may be made with regards to the sequence of processes without departing from the spirit or scope of the present disclosure. Use of a particular sequence is therefore, not to be taken in a limiting sense, and the scope of the present disclosure extends to the appended claims and equivalents thereof.

In some implementations, certain processes of the methods are combined, performed simultaneously or in a different order, or perhaps omitted, without deviating from the spirit and scope of the disclosure. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method for processing communication signals to determine frequency offset compensation in a wireless communication device, the method comprising:
    correlating a received signal with each of a plurality of sub-replica sequences to obtain a vector of matched filter output values associated with a time offset identified by at least one correlation time index value;
    generating, for each of the at least one correlation time index value, a correlation score using a combined energy associated with a combination of the matched filter output values corresponding to all the sub-replica sequences;
    determining, for each of the at least one correlation time index value, a first phase difference computed as an average phase difference between the matched filter output values associated with adjacent sub-replica sequences;
    generating, for each of a subset of the at least one correlation time index value, a second phase difference computed using a linear combination of neighbor first phase differences and a primary first phase difference corresponding to the correlation score within a subset of highest correlation scores; and
    computing, for each of the subset of the at least one correlation index value, an estimate of frequency error using the second phase difference, wherein said frequency error estimate is utilized by the wireless communication device to compensate for a frequency offset in subsequent received signals.

2. The method of claim 1, wherein said generating the second phase difference further comprises:
    linearly combining the at least one neighbor first phase difference with the primary first phase difference to determine the second phase difference.

3. The method of claim 1, wherein said generating the second phase difference further comprises:
    computing the second phase difference using a weighted average of the at least one neighbor first phase difference and the primary first phase difference, wherein a second correlation time index of said at least one correlation time index value corresponds to a neighbor correlation score and said neighbor correlation score is generated using a combined energy associated with a combination of the matched filter output values indexed by the second correlation time index value over all of the sub-replica sequences.

4. The method of claim 3, wherein said generating the second phase difference further comprises:
    determining coefficient values for linearly weighting the at least one neighbor first phase difference and the primary first phase difference associated with the primary correlation score by using a ratio of the primary correlation score and the neighbor correlation score corresponding to each one of the at least one neighbor first phase difference;
    wherein said determining further comprises:
        providing one of: (a) substantially equal weighting for the at least one neighbor first phase difference in response to determining that the ratio of the primary and neighbor correlation scores are substantially equal to one; (b) substantially zero weighting for the at least one neighbor first phase difference in response to determining that the ratio of the primary and neighbor correlation scores are within a first pre-determined range, where the primary correlation score is substantially greater than the neighbor correlation score; and (c) a linearly determined weighting for the at least one neighbor first phase difference in response to determining that the ratio of the primary and neighbor correlation scores are within a second predetermined range that is greater than the first pre-determined range.

5. The method of claim 3, wherein said generating the second phase difference further comprises:
    determining an ideal correlation time index as a fractional time index between the primary correlation time index and a neighbor correlation time index; and
    determining, using the ideal correlation time index, coefficient values for combining the at least one neighbor first phase difference with the primary first phase difference associated with the primary correlation score to determine the second phase difference.

6. The method of claim 1, wherein said generating the second phase difference further comprises:
    sorting a vector of correlation scores corresponding to the at least one correlation time index value;
    selecting a collection of the highest correlation scores from among the plurality of correlation scores within the sorted vector by using a peak vector size limit that provides a pre-determined number of the highest correlation scores and provides reduced computational complexity; and
    determining the second phase difference using (a) the primary first phase difference associated with a highest correlation score from among the selected collection of the highest correlation scores and (b) the at least one corresponding neighbor phase difference.

7. The method of claim 1, wherein:
    said frequency error is associated with a first local oscillator of the wireless communication device and a second local oscillator of a base-station; and
    the frequency error is estimated without requiring a precise establishment of the sample timing.

8. The method of claim 1, wherein said providing the estimate of frequency error further comprises:
    computing the frequency error estimate associated with a particular correlation time index by: performing an angle operation on the second phase difference; and converting, to a frequency value, an angular value obtained from performing the angle operation on the second phase difference.

9. The method of claim 1, further comprising:
    generating a replica signal of a reference signal being transmitted from a base-station;
    creating the sub-replica sequences of the generated replica signal using time-offset partitions of the generated replica signal; and
    triggering said correlating in response to receipt of the first signal.

10. A baseband modem integrated circuit (BMIC) being utilized within a wireless communication device, the BMIC comprising:
- at least one matched filter correlator that correlates a received signal with each of a plurality of sub-replica sequences to obtain a vector of matched filter output values associated with a time offset identified by at least one correlation time index value;
- an energy computation component that computes energy associated with the match filter output values;
- a correlation score generator that determines, for the at least one correlation time index value, a correlation score using a combined energy associated with the matched filter output values corresponding to all the sub-replica sequences;
- a first phase difference generator that determines, for the at least one correlation time index value, a first phase difference computed as an average phase difference between the matched filter output values for adjacent sub-replica sequences; and
- a second, refined phase difference generator that determines, for a subset of the at least one correlation time index value, a second phase difference computed using a linear combination of neighbor first phase differences and a primary first phase difference corresponding to the correlation score within a subset of highest correlation scores; and
- a frequency error estimator, triggered by the second phase difference generator, that computes, for the subset of the at least one correlation index value, an estimate of frequency error using the second phase difference, wherein said frequency error estimate is utilized by the wireless communication device to compensate for a frequency offset in subsequent received signals.

11. The BMIC of claim 10, wherein said second phase difference generator further comprising logic that:
- linearly combines the at least one neighbor first phase difference with the primary first phase difference to determine the second phase difference; and
- performs the linear combining by providing one of:
  - (a) substantially equal weighting for the at least one neighbor first phase difference in response to determining that a ratio of the primary and neighbor correlation scores are substantially equal to one; (b) substantially zero weighting for the at least one neighbor first phase difference in response to determining that the ratio of the primary and neighbor correlation scores are within a first pre-determined range, where the primary correlation score is substantially greater than the neighbor correlation score; and (c) linearly determined weighting for the at least one neighbor first phase difference in response to determining that the ratio of the primary and neighbor correlation scores are within a second predetermined range that is greater than the first pre-determined range.

12. The BMIC of claim 10, wherein said second phase difference generator further comprising logic that:
- computes the second phase difference using a weighted average of the at least one neighbor first phase difference and the primary first phase difference, wherein said at least one second correlation time index value corresponds to a neighbor correlation score and said neighbor correlation score is generated using a combined energy associated with a combination of the matched filter output values indexed by the second correlation time index value over all the sub-replica sequences.

13. The BMIC of claim 12, wherein said second phase difference generator further comprising logic that:
- determines coefficient values for linearly weighting the at least one neighbor first phase difference and the primary first phase difference associated with the primary correlation score by using a ratio of the primary correlation score and the neighbor correlation score corresponding to each one of the at least one neighbor first phase difference.

14. The BMIC of claim 12, wherein said second phase difference generator further comprising logic that:
- determines an ideal correlation time index as a fractional time index between the primary correlation time index and a neighbor correlation time index; and
- determines, using the ideal correlation time index, coefficient values for combining the at least one neighbor first phase difference with the primary first phase difference associated with the primary correlation score to determine the second phase difference.

15. The BMIC of claim 10, wherein said second phase difference generator further comprising logic that:
- triggers a correlation score peak selector to:
  - sort a vector of correlation scores corresponding to the at least one correlation time index value;
  - select a collection of the highest correlation scores from among the plurality of correlation scores within the sorted vector by using a peak vector size limit that provides a pre-determined number of the highest correlation scores and provides reduced computational complexity; and
  - determine the second phase difference using (a) the primary first phase difference associated with a highest correlation score from among the selected collection of the highest correlation scores and (b) the at least one corresponding neighbor phase difference; and
- determines the second phase difference using the neighbor phase differences associated with the selected collection of the highest primary correlation scores that correspond to the subset of the at least one correlation time index value.

16. The BMIC of claim 10, wherein:
- said frequency error is associated with a first local oscillator of the wireless communication device and a second local oscillator of a base-station; and
- the frequency error is estimated without requiring a precise establishment of the sample timing.

17. The BMIC of claim 10, wherein said second phase difference generator further comprising logic that:
- triggers the frequency error estimator to compute the frequency error estimate associated with a particular correlation index value, and wherein said frequency error estimator further comprising logic that:
- performs an angle operation on the second phase difference; and
- converts, to a frequency value, an angular value obtained from performing the angle operation on the second phase difference.

18. The BMIC of claim 10, further comprising logic that:
- generates a replica signal of a reference signal being transmitted from a base-station;
- creates the sub-replica sequences of the generated replica signal using time-offset partitions of the generated replica signal; and
- triggers the BMIC to perform the correlation of the received signal with each of the plurality of sub-replica sequences to obtain the vector of matched filter output values in response to receipt of the received signal.

19. A wireless communication device comprising a baseband modem integrated circuit (BMIC) that includes:
- at least one matched filter correlator that correlates a received signal with each of a plurality of sub-replica sequences to obtain a vector of matched filter output values associated with a time offset identified by at least one correlation time index value;
- an energy computation component that computes energy associated with the match filter output values;
- a correlation score generator that determines, for the at least one correlation time index value, a correlation score using a combined energy associated with a combination of the matched filter output values corresponding to all the sub-replica sequences;
- a first phase difference generator that determines, for the at least one correlation time index value, a first phase difference computed as an average phase difference between the matched filter output values for adjacent sub-replica sequences; and
- a second, refined phase difference generator that determines, for each of a subset of the at least one correlation time index value, a second phase difference computed using a linear combination of neighbor first phase differences and a primary first phase difference corresponding to the correlation score within a subset of highest correlation scores; and
- a frequency error estimator, triggered by the second phase difference generator, that computes for the subset of the at least one correlation index value, an estimate of frequency error using the second phase difference, wherein said frequency error estimate is utilized by the wireless communication device to compensate for a frequency offset in subsequent received signals.

20. The wireless communication device of claim 19, wherein the second phase difference generator further comprising logic that:
- determines an ideal correlation time index as a fractional time index between the first correlation time index and a neighbor correlation time index;
- determines coefficient values for linearly weighting the at least one neighbor first phase difference and the primary first phase difference associated with the primary correlation score by using at least one of the ideal correlation time index and a ratio of the primary correlation score and a neighbor correlation score corresponding to each one of the at least one neighbor first phase difference, wherein said neighbor correlation score is generated using a combined energy associated with a combination of the matched filter output values indexed by the second correlation time index value over all the sub-replica sequences;
- computes a second phase difference using a weighted average of the at least one neighbor first phase difference and the primary first phase difference associated with the primary correlation score; and
- triggers the frequency error estimator to compute the frequency error estimate associated with a particular correlation index value, wherein said frequency error estimator further comprising logic that:
  - performs an angle operation on the second phase difference; and
  - converts, to a frequency value, an angular value obtained from performing the angle operation on the second phase difference.

* * * * *